July 13, 1943. L. BLACKMORE ET AL 2,323,971
VALVE FORGING MACHINE
Filed Nov. 28, 1940 6 Sheets-Sheet 3

Inventors
Lloyd Blackmore &
Marx C. Kristek
By Blackmore, Spencer & Flint
Attorneys July 13, 1943. L. BLACKMORE ET AL 2,323,971
VALVE FORGING MACHINE
Filed Nov. 28, 1940 6 Sheets-Sheet 4
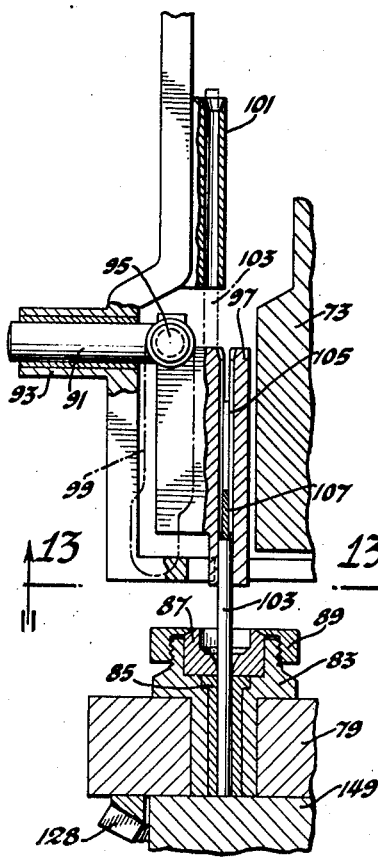
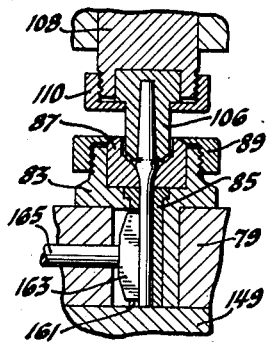
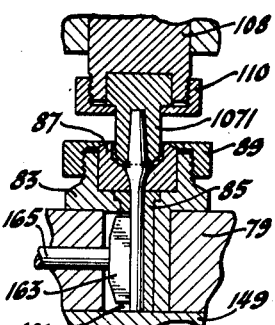
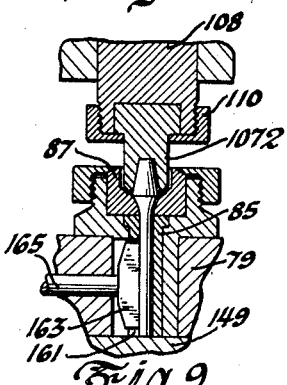
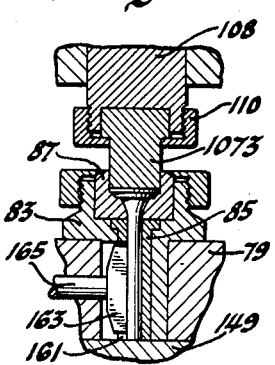
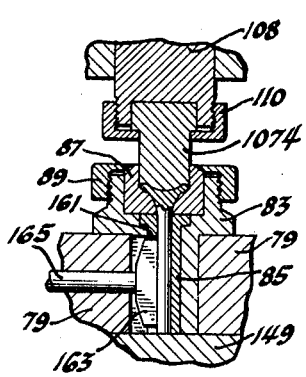
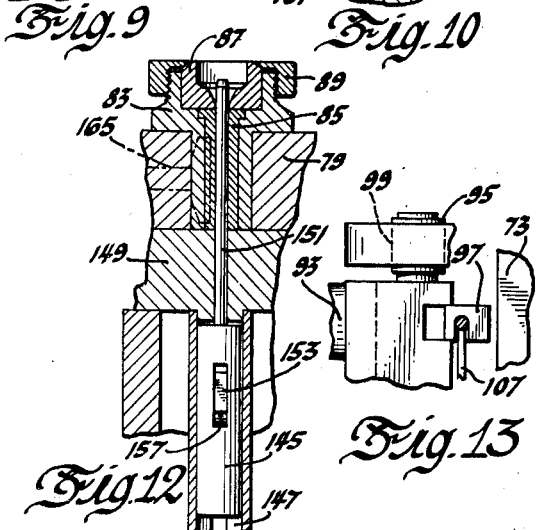
Inventors
Lloyd Blackmore &
Matx C. Kristek
By Blackmore, Spencer & Flint
Attorneys

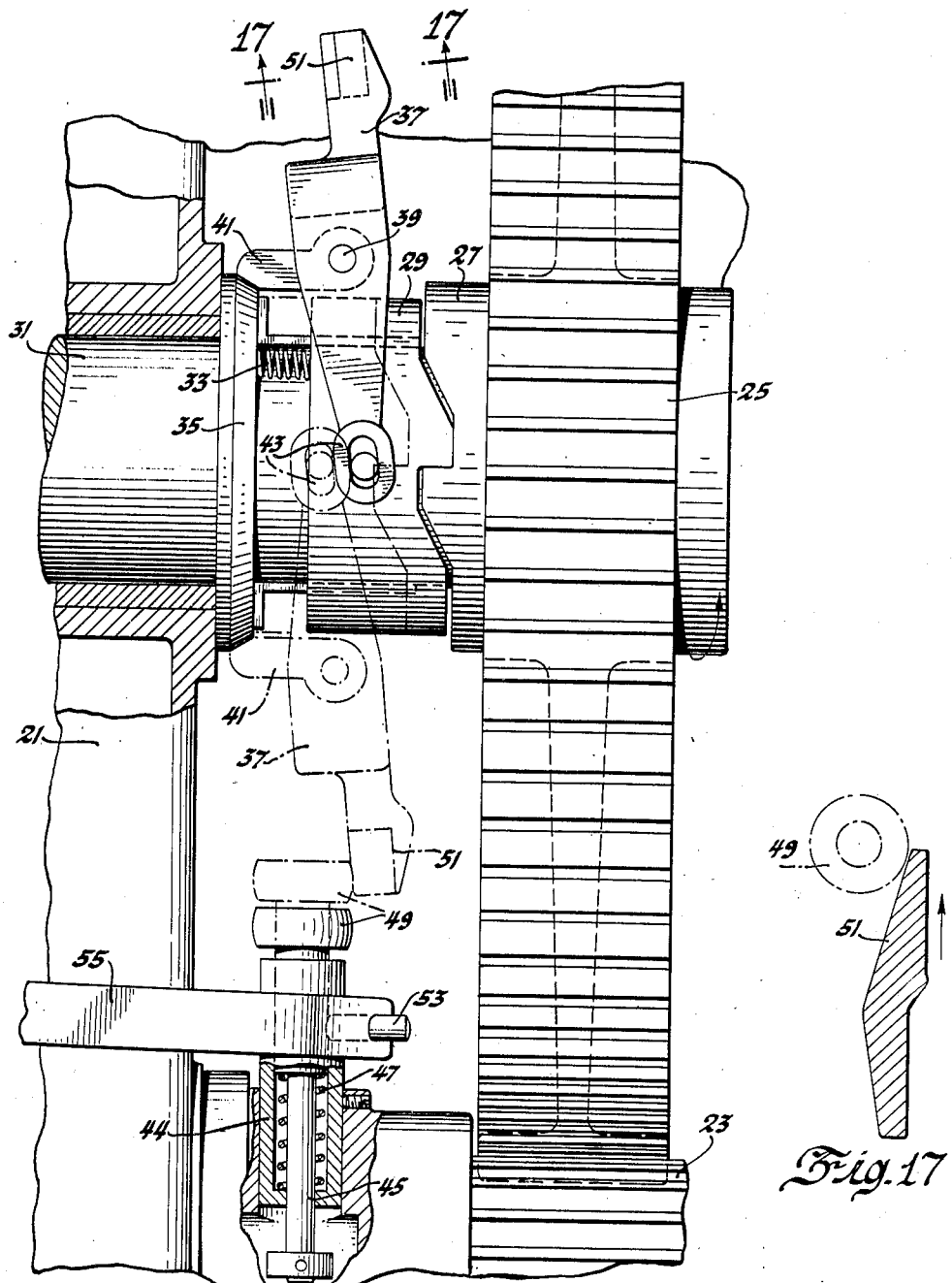

Patented July 13, 1943

2,323,971

UNITED STATES PATENT OFFICE 2,323,971

VALVE FORGING MACHINE

Lloyd Blackmore, Highland Park, and Marx C. Kristek, Flint, Mich., assignors to General Motors Corporation, Detroit, Mich., a corporation of Delaware Application November 28, 1940, Serial No. 367,534

6 Claims. (Cl. 78—13)

This invention relates to a process and a machine for upsetting poppet valves such as are used with the cylinders of engines of the four cycle type to admit explosive mixture and to discharge the products of combustion.

The invention has for its object a novel machine for the expeditious manufacture of such valves, the machine providing a novel means of progressing the work to upsetting stations whereby multiple operations are performed with each stroke of the press to form a completed valve.

Other objects and advantages will be understood from the description which follows:

Figure 3:
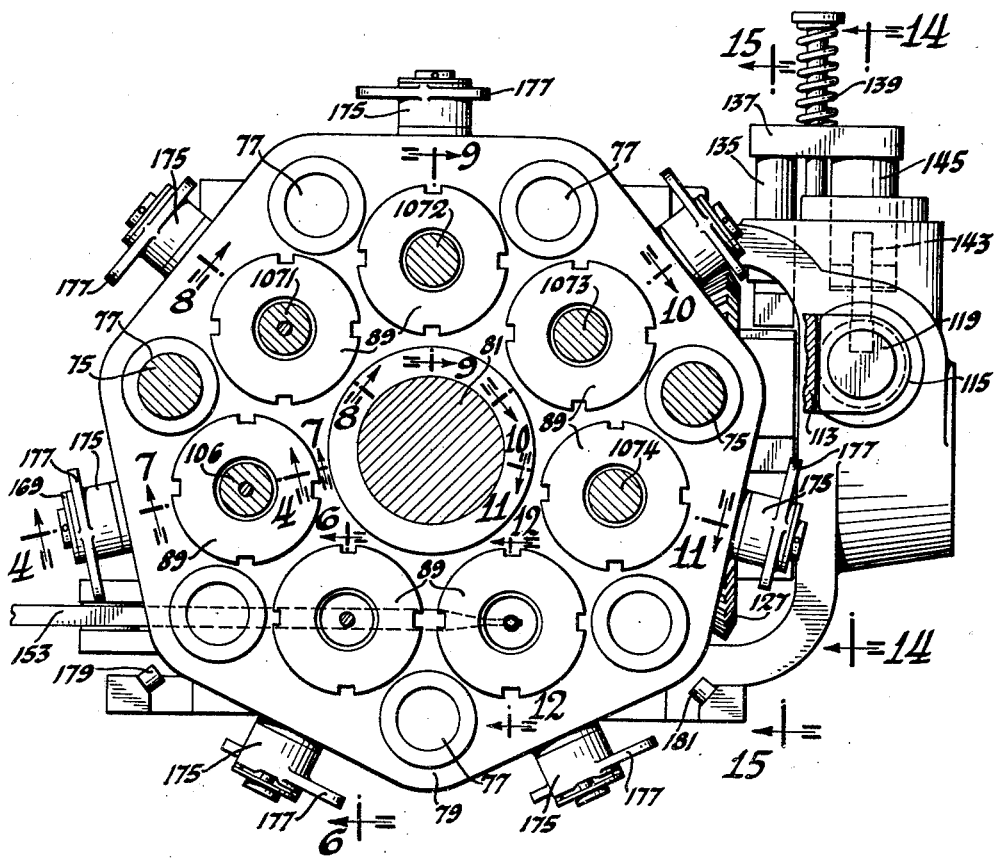
Figure 3 is a plan view of the lower die carrying member as seen from line 3—3 of Figure 2.

Figures 6 to 12, inclusive, are sections as indicated by the appropriate lines of Figure 3.

Figure 13 is a section on line 13—13 of Figure 6.

Figure 14:
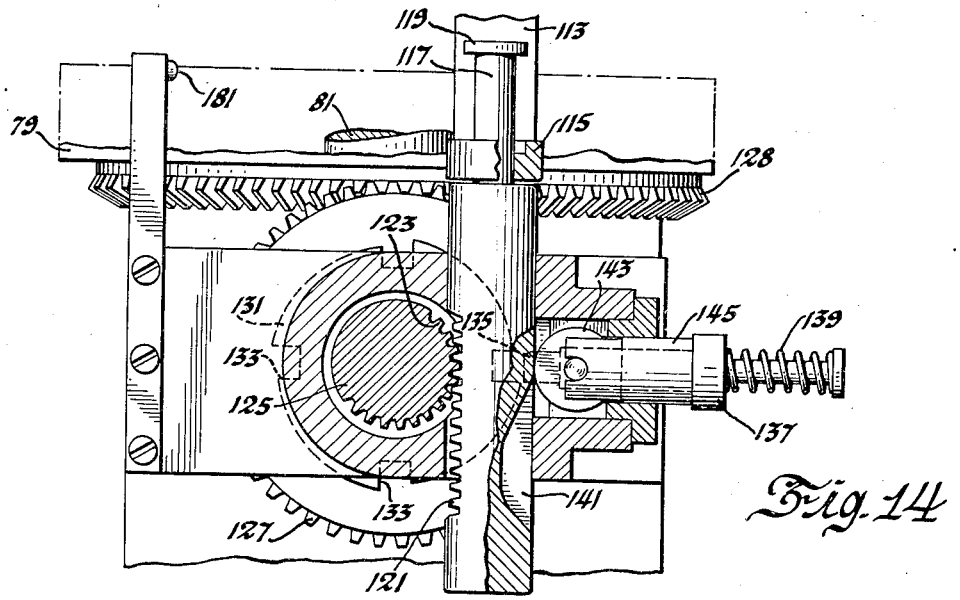
Figure 15:
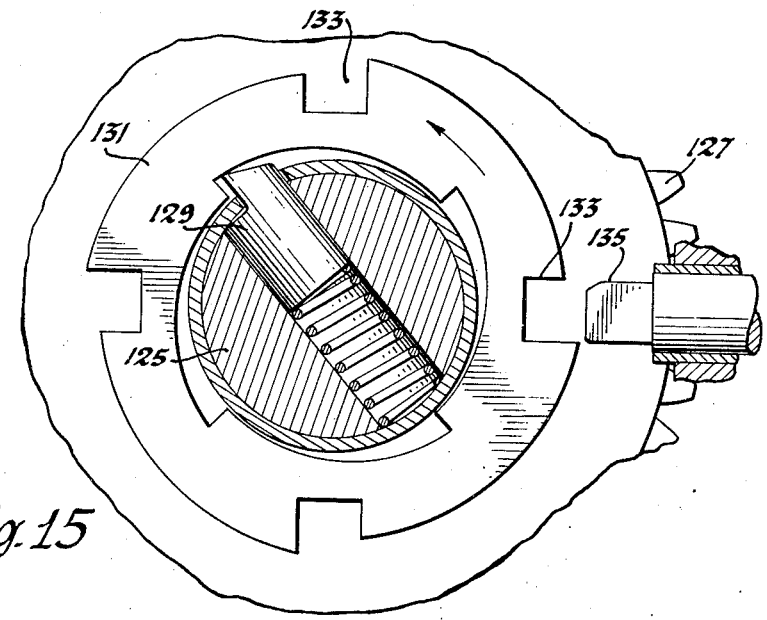

Figures 14 and 15 are sections, the sections being indicated by appropriate lines on Figure 3.

Figure 16 is a view in elevation partly in section, the view being intended to show the clutch releasing mechanism.

Figure 17 is a view on line 17—17 of Figure 16.

The machine includes a supporting frame 21 carrying a motor 22 which drives, by intermediate gearing 23, a gear 25 which is rigid with a clutch element 27. The parts 25 and 27 are rotatably mounted on a shaft 31 while the cooperating clutch member 29 is slidably keyed on shaft 31.

Figure 1:
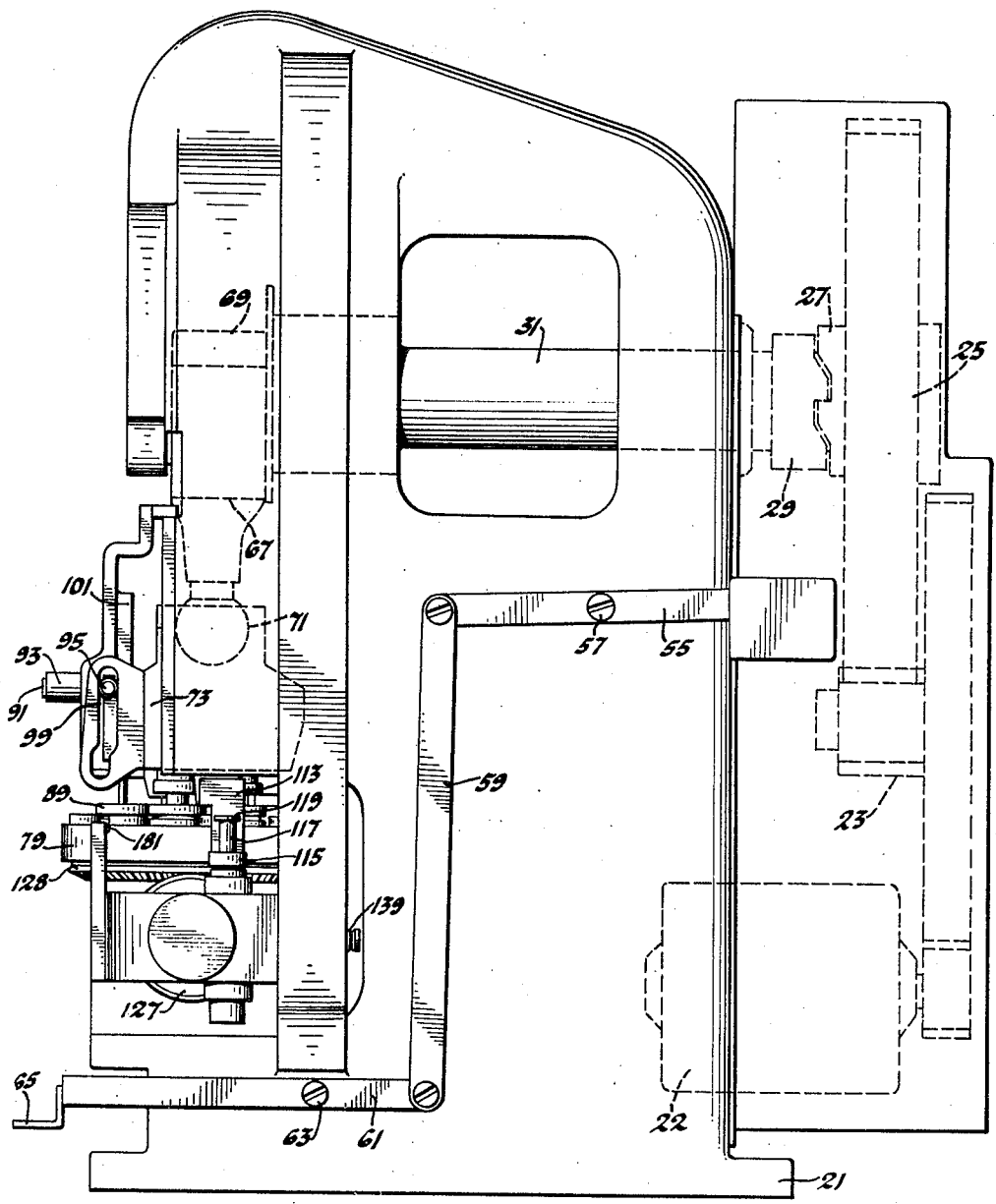
Figure 1 is a view of the machine in side elevation.

As shown on Figure 16, clutch members 27 and 29 are biased into engaged position by springs 33 located between the clutch member 29 and a flange 35 on shaft 31. There is a lever 37 pivoted at 39 to an arm 41 extended from the flange 35. A pin and slot connection as seen at 43 is provided between the work end of this lever and the clutch element 29. Within a part of the supporting frame adjacent the circular path of movement of the other end of lever 37 is secured a sleeve 44. Reciprocable therein is a stem 45. Also within the sleeve is a spring 47. The spring urges a head 49 on the end of stem 45 into the path of movement of an enlarged end 51 of the lever 37. A pin 53 projects from the stem 45. It is engaged by the end of a lever 55 pivoted at 57 (see Fig. 1). The other end of lever 55 is pivoted to the end of a compression link 59, the latter being reciprocated by a manually operable lever 61, pivoted at 63. Pressure on the pedal end 65 of lever 61 operates to hold the head 49 away from the lever end 51 with the result that spring 33 effects the engagement of the clutch elements 27 and 29 whereby the shaft 31 is rotated. To release the clutch, manual pressure on the pedal 65 is relieved whereupon part 49 moves into the path of the rotating lever 37 so that the lever is rocked when its end 51 engages 49 and the rotation of lever 37 moves clutch member 29 away from clutch member 27 against the resilient action of spring 33.

Shaft 31 terminates with an eccentric 67 surrounded by an annulus 69 carrying a ball 71 seated in a socket in an upper vertically reciprocable upsetting member 73 whereby said upper member is reciprocated upwardly and downwardly in response to rotation of shaft 31. This upper member is suitably guided by the frame member of the machine. The upper member carries a plurality of depending guide rods 75 for passage through guide openings 77 in a lower die carrying member 79. Upon their upward movement the rods 75 move from openings 77 so that the lower member 79 may rotate about a central axis 81.

The lower member has a series of die holders arranged in a circle and of which numeral 83 (Figure 6) is illustrative. Within each die holder is an apertured and longitudinally slotted sleeve 85, the sleeve being intended to receive the lower end of a length of rod that will be the stem of the finished valve. The die 87 carried by the holder 83 is held in position by a threaded cap 89. The die 87 is shaped as required to form the head of a valve. There are seven of these die holders as shown by Figures 6 to 12, inclusive. Figure 6 shows the die holder into which the blank (a predetermined length of rod with a heated end section) is to be inserted. Figures 7 to 11 show steps in the formation of the valve from the blank. Referring to Figure 6 it will be seen that a reciprocable rod 91 is slidable transversely in a part 93 rigid with the frame. At its inner end this rod 91 carries a pin 95 extending at right angles to the axis of the rod. The pin is connected to a transversely slidable part marked 97. The pin 95 is guided in a cam slot 99 formed in any convenient way in the above described vertically slidable upper member. Above the pin 95 is a feed cylinder 101 carried rigidly by the frame and intended for the reception of the heated rod from which a valve is to be formed. A blank 103 (shown in dotted lines Fig. 6) is fed through this cylinder 101 and may rest on the top of part 97. When the upper member is moved to its uppermost position the cam slot moves part 97 laterally so that a passage 105 therein may register with the feed passage 101 and the blank then drops within said passage 105. Simultaneously with the upward movement of the upper member, a lever 107 is rocked upwardly about its pivot 109 by a pin 111 carried by the upwardly moving member and engaging a slot in the intermediate part of the lever. The lever end which extends within passage 105 is thus removed from the passage before the cam slot functions to shift the member 97. When the upper member moves downwardly, and after the blank has been inserted, the lever end enters and moves downwardly in the passage 105 as shown in Figure 6. Its arm is of such length that the end moves faster than the upper member whereby the blank is pushed by the lever to its lowermost position as shown by Figure 6.

While a new blank is thus being inserted as in Figure 6 by the downward movement of the upper member, this same downward movement progressively shapes heads on the stems of previously inserted blanks, this being shown in Figures 7 to 11, inclusive. For this purpose the nonrotatable upper member carries upsetting plungers such as 106, 1071, 1072, 1073, 1074 held by parts 108, 110 as shown by these several figures. It will be seen, therefore, that for the purpose of using each die upon each descent of the upper member, the lower member must be rotated after each lifting movement of the upper member to an extent sufficient to subject each blank to the nearest successive operation.

Figure 2:
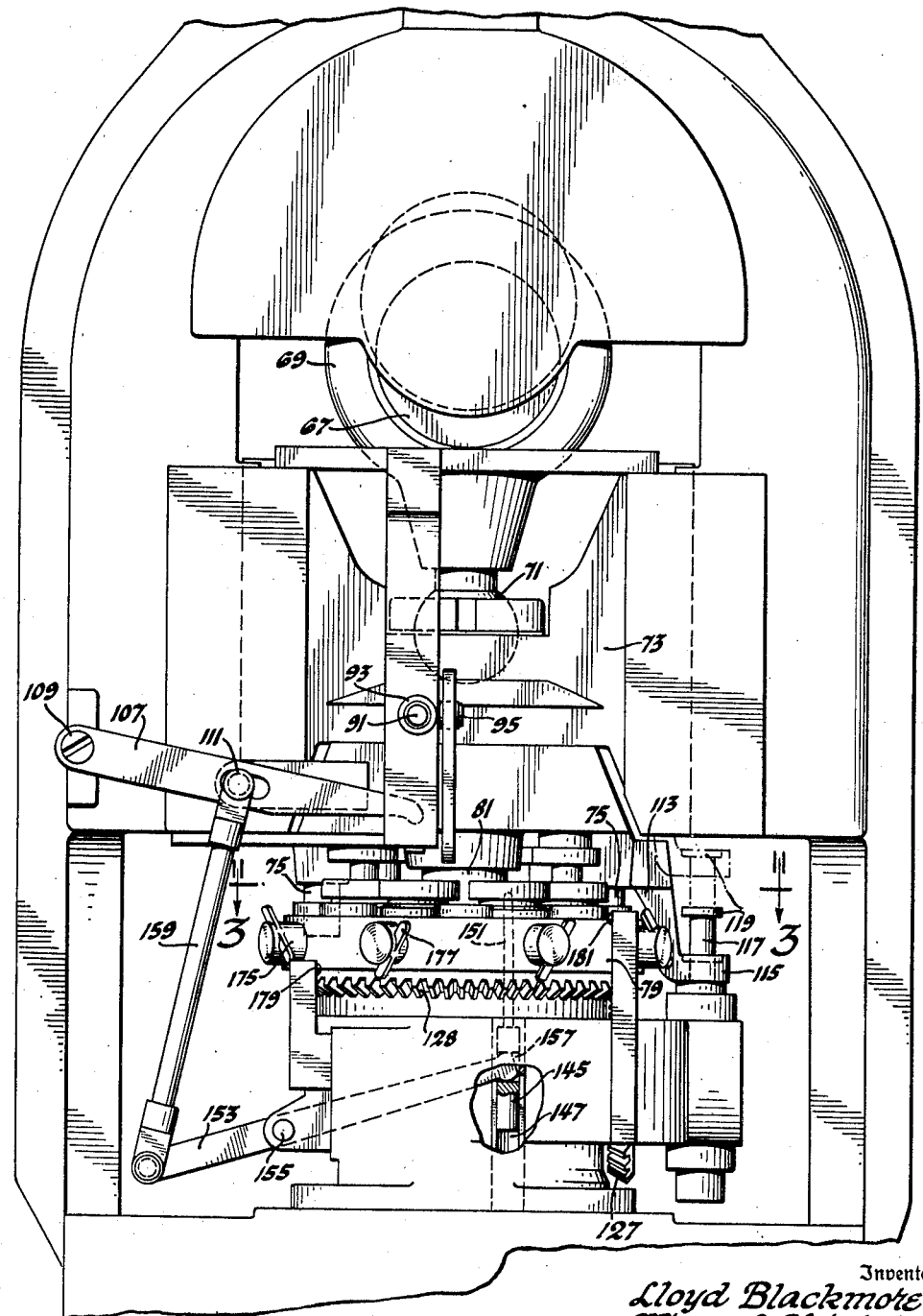
Figure 2 is a view in front elevation.

For the purpose of rotating the lower die carrying member the following expedient is employed. The guide rods 75 on the upper member must obviously be removed from the lower member before that member is rotated and they are so dimensioned as to leave the openings 77 when the upper member rises. To the upper member is secured one or more arms 113, each terminating in an apertured collar 115 slidable on the stem of a rack 117, see Fig. 14, and beneath a head 119. The head is engageable with the collar and may be lifted as shown in Figure 2 whereby the rack is raised. The teeth 121 of the rack (see Figure 14) engage the teeth 123 of a pinion 125 whereby a beveled gear 127 is rotated. This beveled gear 127 is in mesh with a beveled gear 128 carried on the under side of the rotatable die carrying member 79. Between the pinion 125 and the beveled gear 127 is a one-way drive spring pressed dog 129 as shown in Figure 15, the dog engaging cam notches in a member 131 which may be rigid with gear 127. By this means the upward movement of the rack serves to rotate the parts described but its downward movement takes place without any rotation of the gear. To lock the gears and lower die carrying member in position while the guide rods 75 are being lowered, the member 131 has notches 133, successively engaged by a plunger 135 having a head 137 (Figures 3 and 14). The head 137 is engaged by spring 139. Obviously the plunger must be held clear of the notches to permit the rack to rise and for that purpose the rack is provided with a cam slot 141 to receive a roller 143 on a sleeve 145 also carried by head 137. As the reciprocating member 73 moves upwardly and before the engagement with the head 119 of the rack the guide rods 75 rise from the openings 77 whereby the lower member is free to be rotated. After the collar 115 engages the head 119 of the rack the rack is raised. In rising, it rotates the pinion 125 and gear 127 and turns lower member 79. As the rack rises the plunger 135 rides over the surface of 131 between the notches 133 and drops into the next adjacent notch under the influence of spring 139, being permitted to do so because the cam slot 141 is then opposite the roller 143. As the upper member descends and pushes the rack the one-way drive at 129 is inoperative, and the lock device 135 holds the table from rotation until locked by the rods 75. Thereafter the wall of the cam slot 141 engages the roller 143 and the locking pin 135 is removed from the notch 133, the parts being then positioned as shown by Figure 14.

The valve formation is completed by the upsetting step shown in Figure 11. When the die carrier is rotated to the position shown in Figure 12, no additional upsetting takes place but in this stage the valve is to be removed. For that purpose a push rod 145 (Figure 12) slides in a passage 147 provided for the purpose. It is adapted to push an ejector rod 151 upwardly through the base 149 and through the sleeve 85 to engage the valve stem and eject the valve. This upward reciprocation is effected by a lever 153 pivoted at 155 (Figure 2). The work end of the lever enters a slot 157 in rod 145. Its power end is pivoted to a link 159, the other end of the link being connected to pin 111. In this way, simultaneously with the movement of lever 107 to push a new blank into position, push rod 151 ejects a completed valve. The process is thus continuous and the operation is sufficiently rapid so that the heated blank travels through the several steps of the operation before becoming cool.

Figure 4:
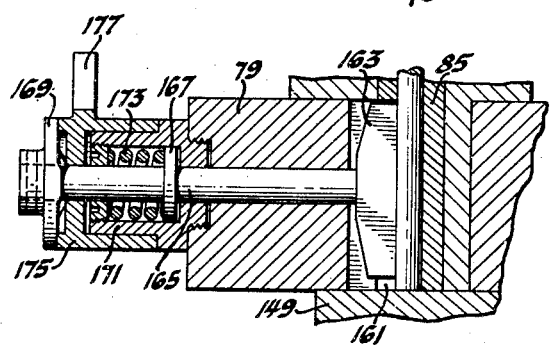
Figure 4 is a section on line 4—4 of Figure 3.
Figure 5:
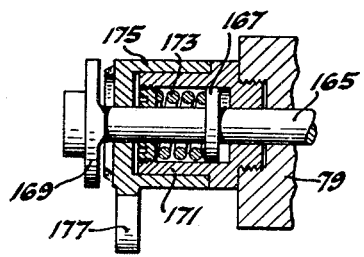
Figure 5 is a section like Figure 4, but with parts displaced.

It is necessary that the stems be gripped in the several steps identified by Figures 7 to 11. The gripping must become effective just after the reception of the blank as shown by Figure 6 and before the forging operation shown by Figure 7. The gripping device must also be released just before the ejection step shown by Figure 12. For this purpose each sleeve 85 is longitudinally slotted as shown at 161, in Figure 4. The valve stem is to be gripped between the part of the sleeve 85 opposite the slot and by a movable gripping member 163, the latter having a stem 165 formed with a flange 167 and a cam-shaped head 169. The flange 167 is located within a closed cup 171 threaded to the die carrier and a spring 173 also within the cup presses the stem and the gripping member 163 toward its active position. A sleeve 175 is rotatably supported on the cup 171. It has a cam-shaped head cooperating with head 169 and it also has a radial arm 177. In one position of the arm the gripping device 163 is held from gripping position by the cooperating cams and in another position the cam construction releases the gripping device 163 to the influence of the spring 173.

As the die carrier rotates from the position of Figure 6 to that of Figure 7 a lug 179, Fig. 3, engages one end of the arm 177 and rotates the sleeve 175 so that the spring 173 functions to cause the stem to be gripped as explained above. This gripping continues until the several upsetting operations are completed. Just before reaching the Figure 12 position another lug 181, Fig. 3, engages the other end of arm 177 and rotates the member 175 to withdraw the gripping member 163 from engagement with the stem. By this means the valve may be ejected by the action of the parts shown in Figure 12 and as hereinbefore described.

It will be seen that by means of the apparatus described, a heated blank is fed into the receiving cylinder 101 for each successive step in the rotation of the lower member 79, and that upon the descent of the upper member the blank is positioned in the first die, that of Figure 6. Simultaneously the cooperating die and plunger of Figure 7 produces an elongated frustum of a cone on the blank which is just ahead of the one being inserted. The same simultaneous descent of the upper member produces in the next die, that shown by Figure 8, a shortened conical end. Figure 9 showing the die and plunger next in advance of that of Figure 8 shows a still further shortening of the cone on the end of the blank. In Figure 10 the plunger 1073 is flat on its under side and forms the normal valve head. In Figure 11, the last of the upsetting steps, a recess is formed in the valve head by a somewhat convex shape given the plunger. As explained above, Figure 12 shows the step where the valve is ejected.

We claim:

1. A machine for upsetting poppet valves comprising a rotatable table, a plurality of head forming dies distributed in a circular series upon said table, a reciprocable non-rotatable member above said table carrying a circular series of plungers to cooperate in sequence with the intermediate head forming dies as the table rotates, said plungers formed to successively shape the end of a blank in each of said dies to form a valve head, together with means to feed a blank into a first of said dies, said last named means comprising a fixed tubular member to receive said blank and located above but offset from said first die, a laterally movable tubular member vertically between said first die and said fixed tubular member and mechanism responsive to a reciprocating movement of said non-rotatable member to move said movable tubular member from registration with said fixed tubular member and into registration with said first die.

2. A machine for upsetting poppet valves comprising a rotatable table, a plurality of head forming dies distributed in a circular series upon said table, a reciprocable non-rotatable member above said table carrying a circular series of plungers to cooperate in sequence with the intermediate head forming dies as the table rotates, said plungers formed to successively shape the end of a blank in each of said dies to form a valve head, together with means to feed a blank into a first of said dies, said last named means comprising a fixed tubular member to receive said blank and located above but offset from said first die, a laterally movable tubular member vertically between said first die and said fixed tubular member and mechanism responsive to a reciprocating movement of said non-rotatable member to move said movable tubular member from registration with said fixed tubular member and into registration with said first die, said mechanism comprising a pin on the laterally movable member and a cooperating cam slot formed in said non-rotatable member.

3. A machine for upsetting poppet valves comprising a rotatable table, a plurality of head forming dies distributed in a circular series upon said table, a reciprocable non-rotatable member above said table carrying a circular series of plungers to cooperate in sequence with the intermediate head forming dies as the table rotates, said plungers formed to successively shape the end of a blank in each of said dies to form a valve head, together with power driven means oppositely to reciprocate said non-rotatable member toward and from said rotatable table, locking rods carried by said non-rotatable member to engage said table and rack and pinion means operable to rotate said table in response to the upward movement of said non-rotatable member and one-way clutch means associated with said rack and pinion to render said rack and pinion inoperative upon said table in response to the opposite movement of said non-rotating member.

4. A machine for upsetting poppet valves comprising a rotatable table, a plurality of head forming dies distributed in a circular series upon said table, a reciprocable non-rotatable member above said table carrying a circular series of plungers to cooperate in sequence with the intermediate head forming dies as the table rotates, said plungers formed to successively shape the end of a blank in each of said dies to form a valve head, together with power driven means oppositely to reciprocate said non-rotatable member toward and from said rotatable table, locking rods carried by said non-rotatable member to engage said table and rack and pinion means operable to rotate said table in response to the upward movement of said non-rotatable member and one-way clutch means associated with said rack and pinion to render said rack and pinion inoperative upon said table in response to the opposite movement of said non-rotating member, and a spring operated locking pin to hold said table from rotation during said inoperative movement of the rack and supplementary means operable to release said locking pin subsequent to the locking of the table by the rods.

5. A machine for upsetting poppet valves comprising a rotatable table, a plurality of head forming dies distributed in a circular series upon said table, a reciprocable non-rotatable member above said table carrying a circular series of plungers to cooperate in sequence with the intermediate head forming dies as the table rotates, said plungers formed to successively shape the end of a blank in each of said dies to form a valve head, together with means to simultaneously feed a blank into a first of said dies and eject the formed valve from the last of said dies, said last named means comprising a plurality of levers rotatable simultaneously in opposite directions, first mechanism whereby one lever is operable to feed a blank to the first die and second mechanism whereby the other lever functions to eject the finished valve from the last die.

6. A machine for upsetting poppet valves comprising a rotatable table, a plurality of head forming dies distributed in a circular series upon said table, a reciprocable non-rotatable member above said table carrying a circular series of plungers to cooperate in sequence with the intermediate head forming dies as the table rotates, said plungers formed to successively shape the end of a blank in each of said dies to form a valve head, together with means to simultaneously feed a blank into a first of said dies and eject the formed valve from the last of said dies, said last named means comprising a plurality of levers rotatable simultaneously in opposite directions, first mechanism whereby one lever is operable to feed a blank to the first die and second mechanism whereby the other lever functions to eject the finished valve from the last die, and means responsive to the reciprocation of said non-rotatable member to rock said levers.

LLOYD BLACKMORE.
MARX C. KRISTEK.